No. 854,021. PATENTED MAY 21, 1907.
J. H. BRADY.
WRAPPING MACHINE.
APPLICATION FILED APR. 3, 1905.

9 SHEETS—SHEET 1.

Witnesses
Stella C. Norris.
F. H. Kappa

Inventor
J. Henry Brady
by Abraham Knobel
Attorney

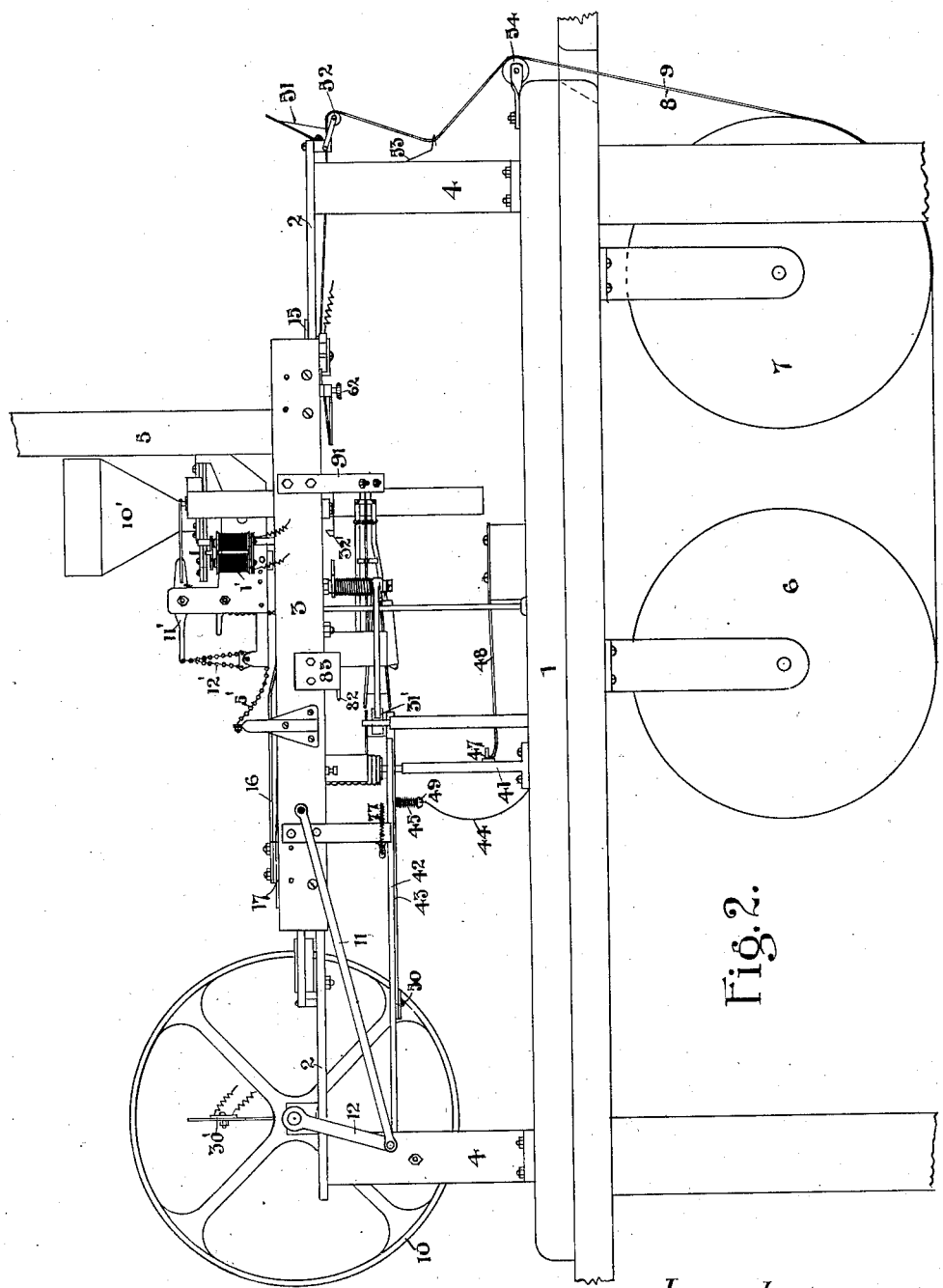

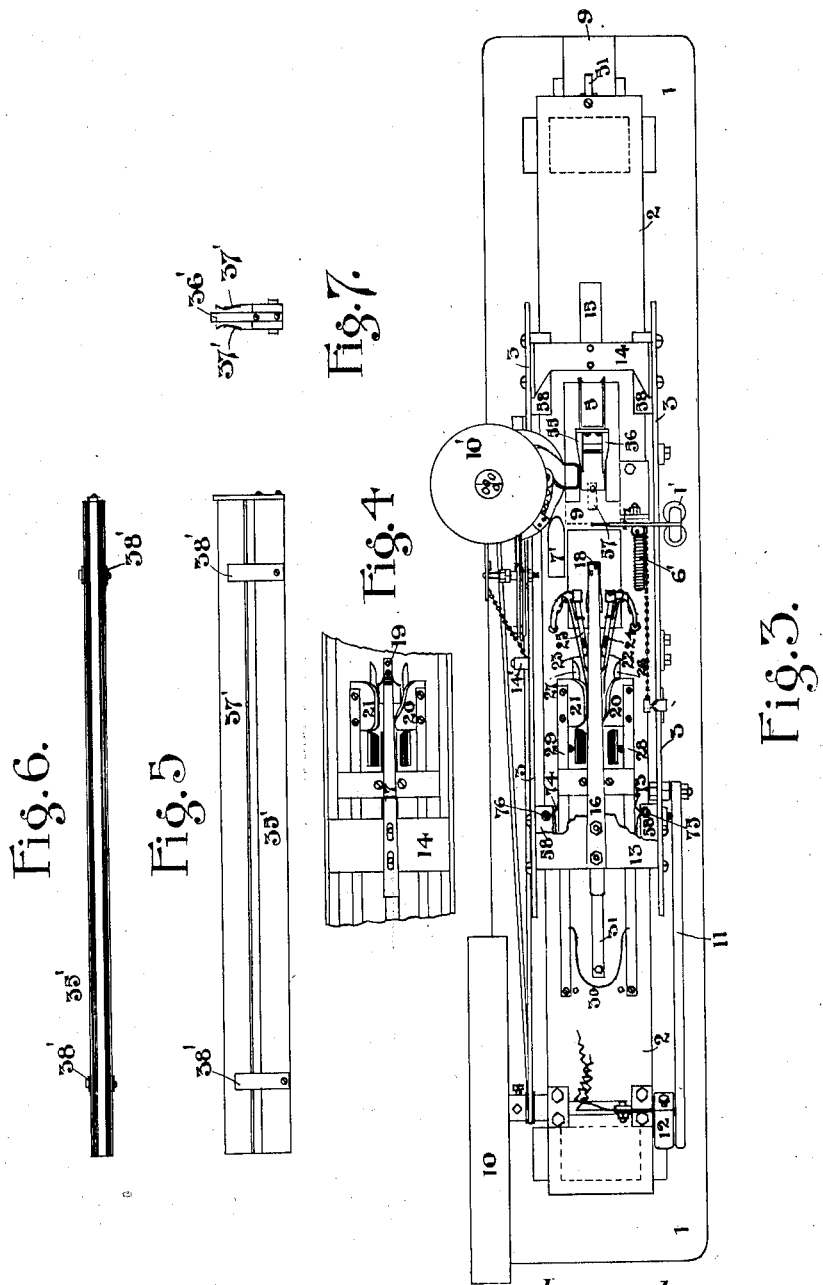

No. 854,021. PATENTED MAY 21, 1907.
J. H. BRADY.
WRAPPING MACHINE.
APPLICATION FILED APR. 3, 1905.

9 SHEETS—SHEET 4.

Witnesses
Stella C. Norris.
F. H. Keppa

Inventor
J. Henry Brady
by Abraham Knobel
Attorney

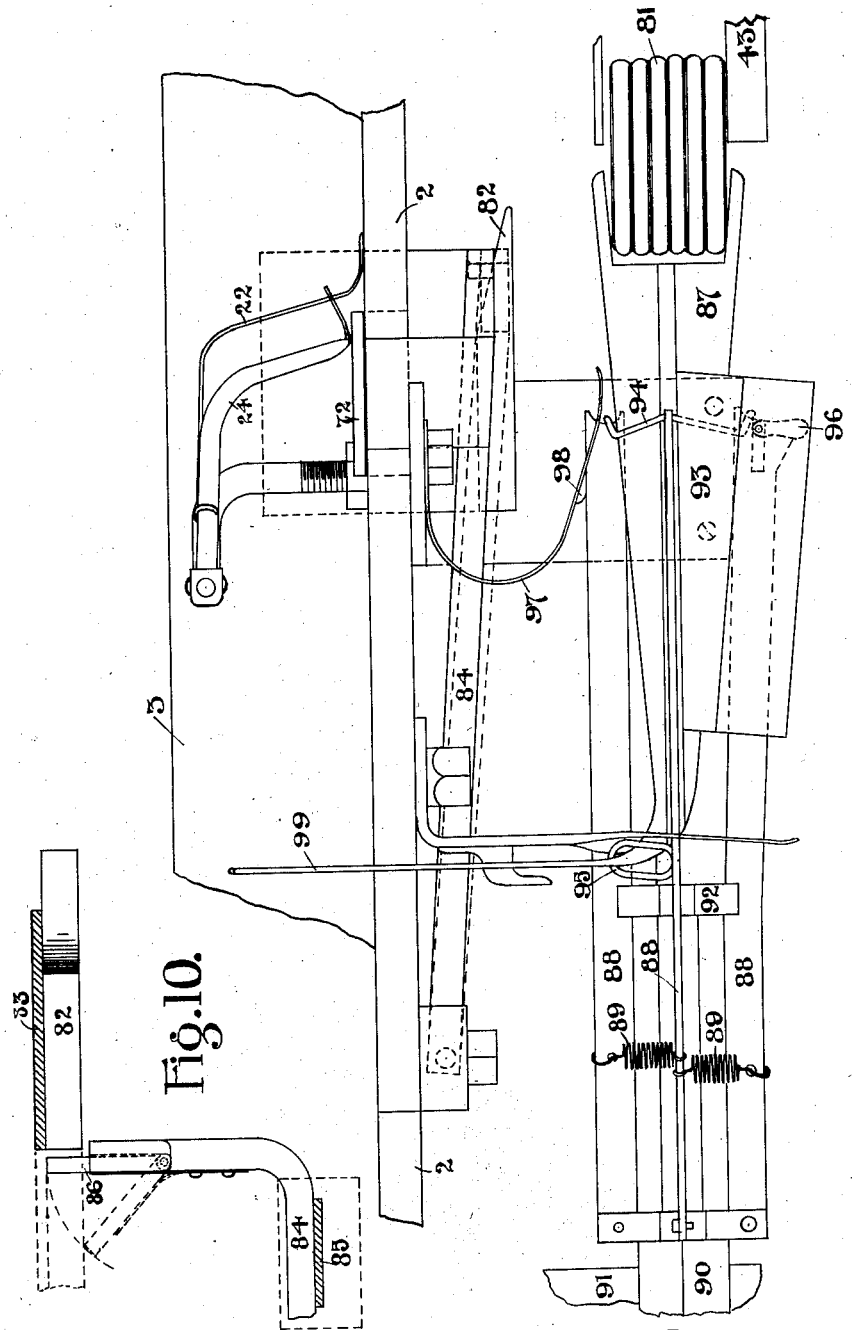

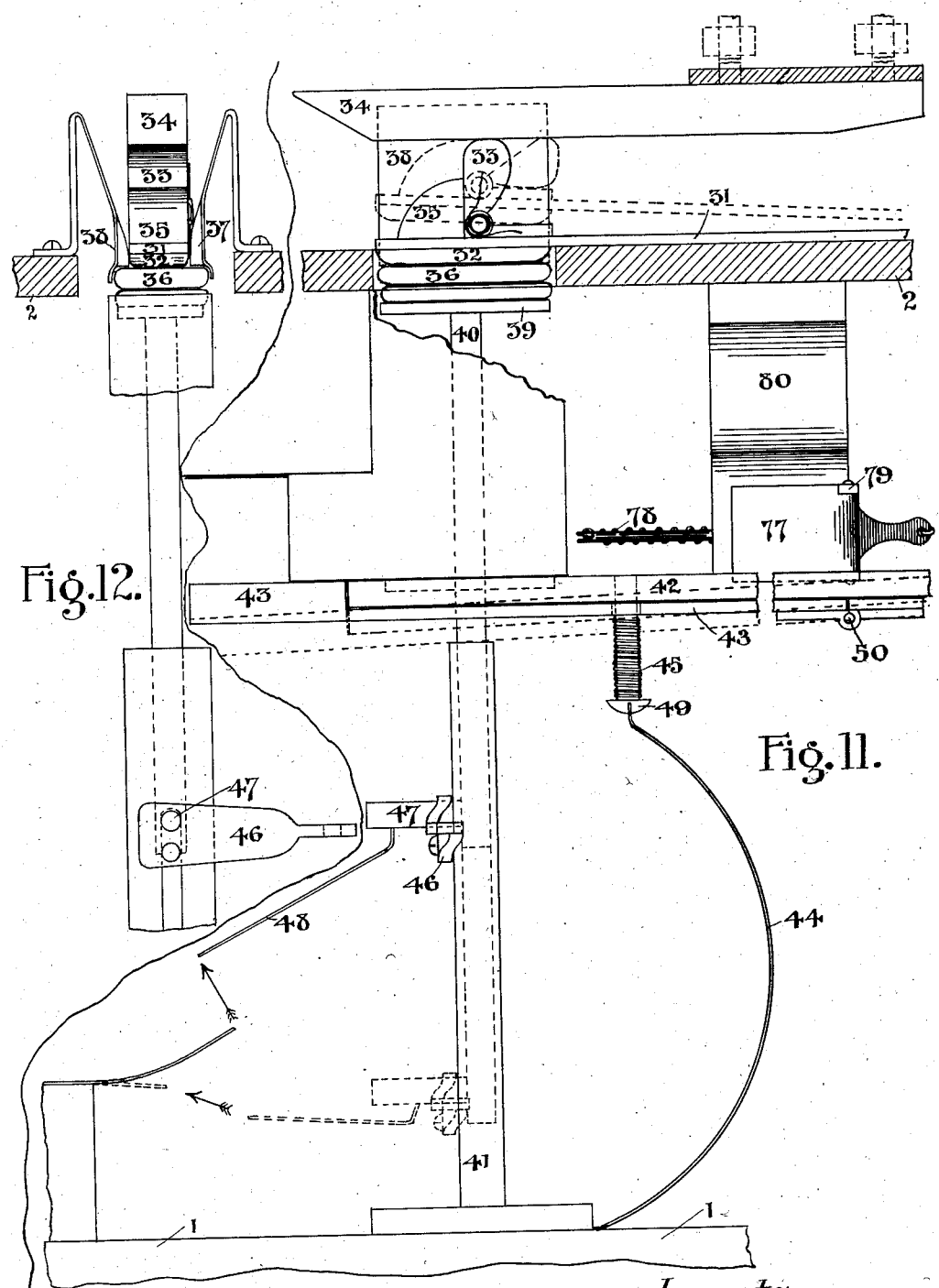

No. 854,021. PATENTED MAY 21, 1907.
J. H. BRADY.
WRAPPING MACHINE.
APPLICATION FILED APR. 3, 1905.

9 SHEETS—SHEET 7.

Witnesses
Stella L. Norris
F. H. Kappa

Inventor
J. Henry Brady
by Abraham Knobel
Attorney

No. 854,021.

PATENTED MAY 21, 1907.

J. H. BRADY.
WRAPPING MACHINE.
APPLICATION FILED APR. 3, 1905.

9 SHEETS—SHEET 8.

Witnesses
Stella C. Norris
J. H. Kappa

Inventor
J. Henry Brady
by Abraham Knobel
Attorney.

No. 854,021. PATENTED MAY 21, 1907.
J. H. BRADY.
WRAPPING MACHINE.
APPLICATION FILED APR. 3, 1905.
9 SHEETS—SHEET 9.
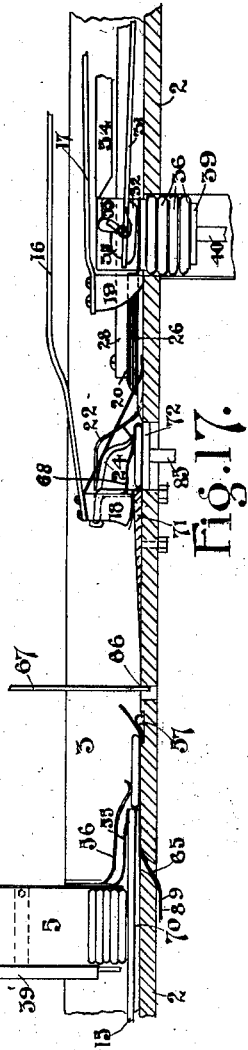
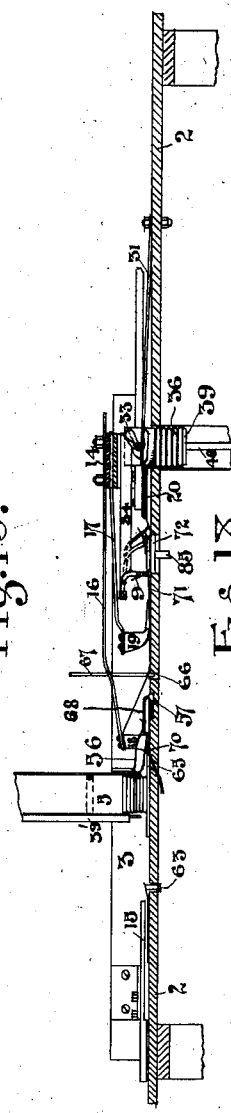
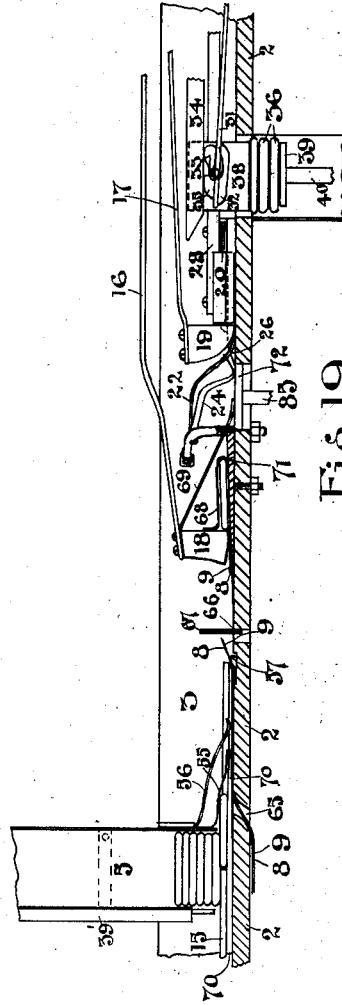
Witnesses
Stella C. Norris
F. H. Kappa
Inventor
J. Henry Brady
by Abraham Knobel
Attorney

UNITED STATES PATENT OFFICE.

JAMES HENRY BRADY, OF LOUISVILLE, KENTUCKY, ASSIGNOR TO HIMSELF AND DAVID A. KELLER, OF LOUISVILLE, KENTUCKY.

WRAPPING-MACHINE.

No. 854,021.  Specification of Letters Patent.  Patented May 21, 1907.

Application filed April 3, 1905. Serial No. 253,517.

*To all whom it may concern:*

Be it known that I, JAMES HENRY BRADY, a citizen of the United States, residing at Louisville, in the county of Jefferson and State of Kentucky, have invented certain new and useful Improvements in Wrapping-Machines, of which the following is a specification.

The invention relates to machine for wrapping articles, such for instance as cakes of chewing gum, in paper and the like. Its objects are, generally stated, to provide a machine of simple and inexpensive construction that will automatically continuously perform the wrapping operations neatly and quickly; that will assemble a plurality of wrapped articles into a pack and place a rubber band over them; that will wrap the articles in a waxed paper and a printed label-paper and register the label perfectly on the cake. The wrappers are in the form of a rolled web upon which the articles are fed and from which uniform lengths, constituting individual wrappers are severed.

That embodiment of the invention shown in the accompanying drawings is one that experience has demonstrated to be practical and efficient. The details of structure and arrangement may, however, be varied by those skilled in such matters without departing from the principles of the invention.

Figure 1:
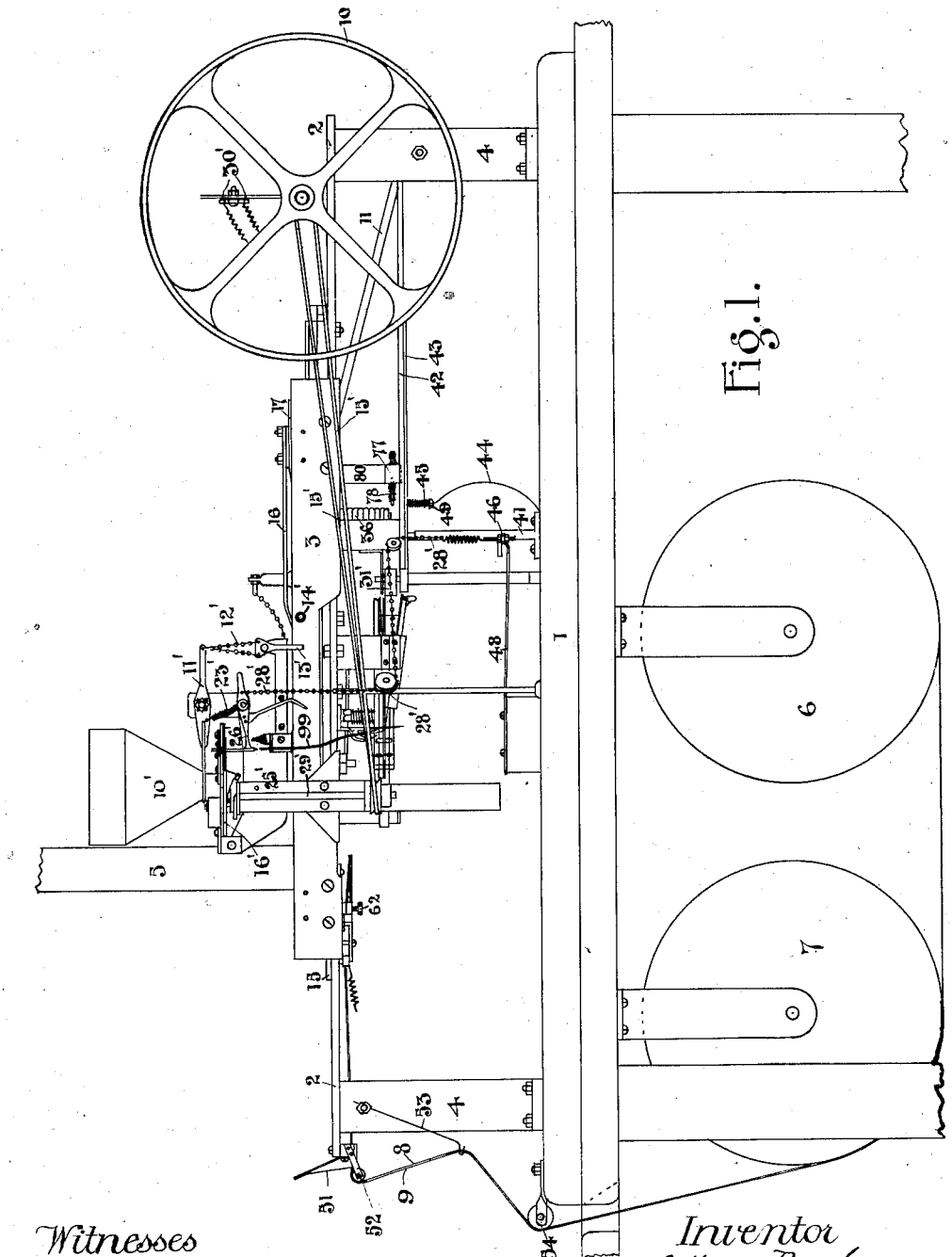
Figure 8:
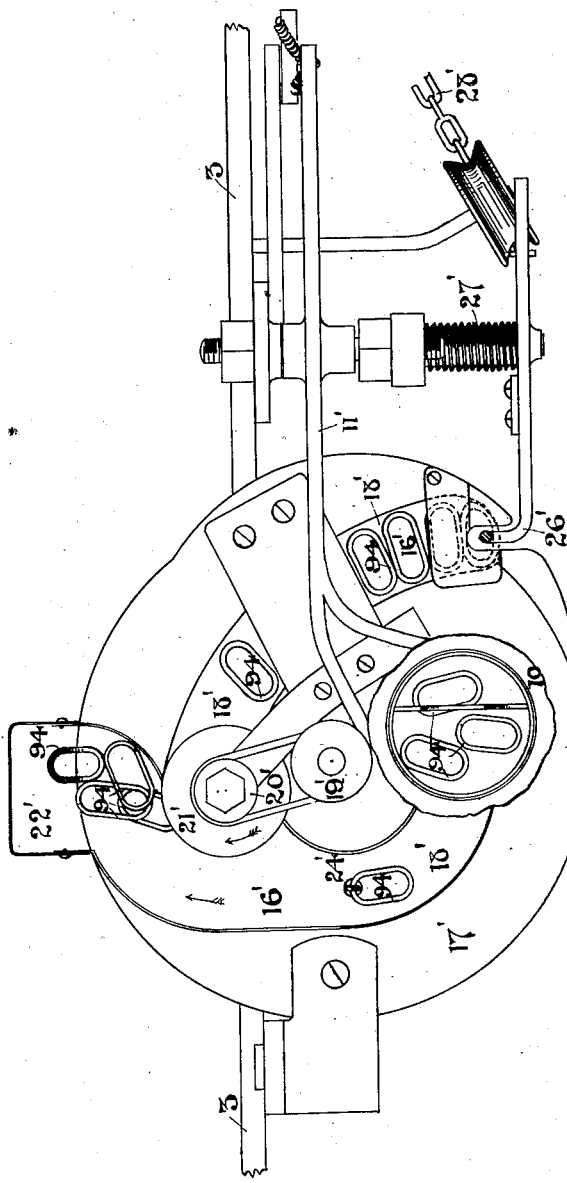
Figure 14:
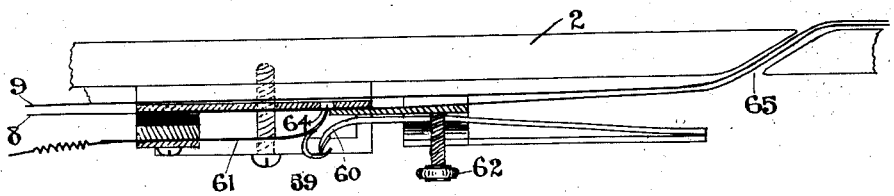
Figure 15:
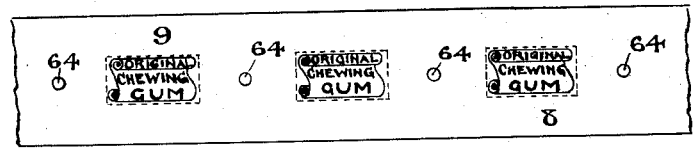
Figure 13:
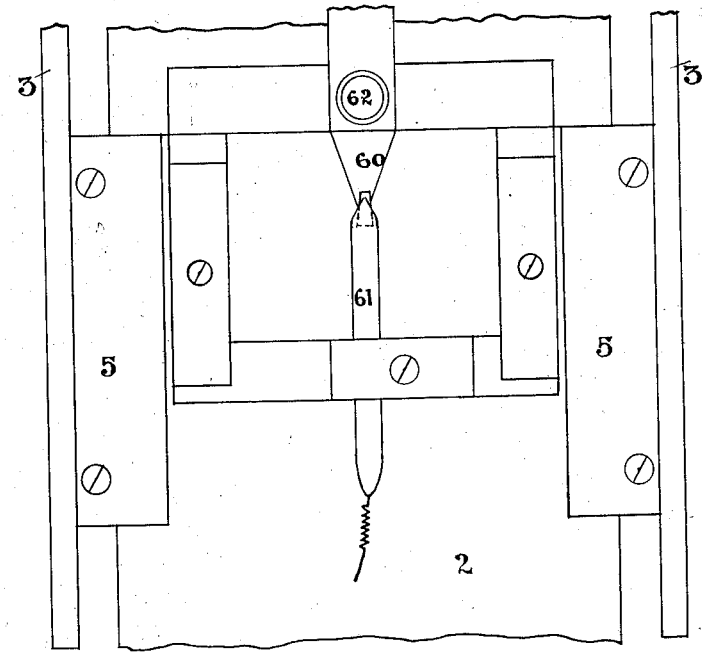
Figure 20:
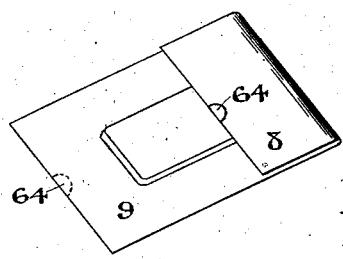
Figure 21:
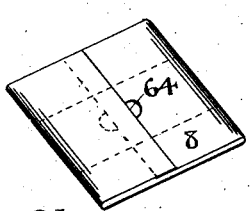
Figure 22:
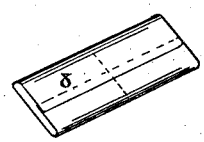
Figure 23:
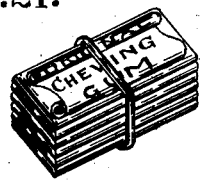
Figure 16:
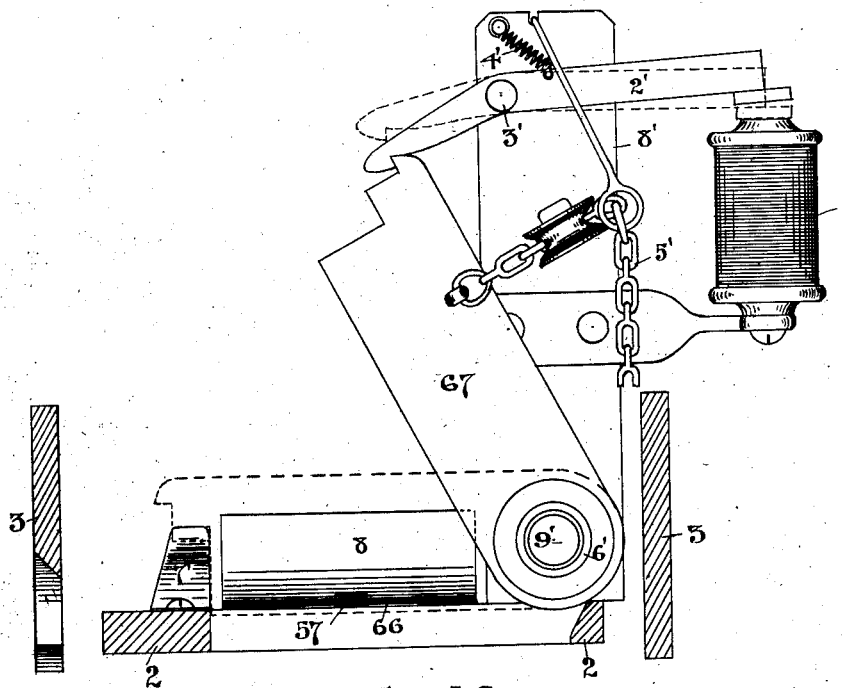

Figure 1 is an elevation of the left hand side of the machine; Fig. 2, an elevation of the right hand side: Fig. 3, a plan view; Fig. 4, a detail of the plan view: Fig. 5, a side elevation; Fig. 6, an edge view; and Fig. 7, a bottom view of the hopper-filler; Fig. 8, a plan view of the rubber-band-separator; Fig. 9, a side elevation of the rubber-band-applying apparatus; Fig. 10, a plan view of a detail of the platform-elevating cam; Fig. 11, a side elevation of the packing-platen and auxiliary parts; Fig. 12, an end view of the cake-packing apparatus; Fig. 13, a bottom plan view of the electric contact-apparatus; Fig. 14, a sectional detail view of the electric contact-apparatus; Fig. 15, a plan view of the label-web; Fig. 16, a front detail elevation of the paper-shearing apparatus; Figs. 17, 18 and 19 are side views, partly in section, illustrating the several stages of the wrapping process; Fig. 20, a perspective view showing the first fold in the wrapping process; Fig. 21, a perspective view showing the second fold; Fig. 22, a perspective view showing the completely wrapped cake; and Fig. 23, the completed package with the rubber band applied.

The machine illustrated is especially designed for wrapping cakes of chewing gum in two papers, a waxed sheet in contact with the gum, and an outside label sheet.

The bed-plate 1, base-plate 2, carriage 3, legs 4, and hopper 5 constitute the body of the machine, mounted on a suitable supporting frame. The waxed and label sheets are fed to the machine, preferably in the form of continuous webs, from rolls 6 and 7 (Figs. 1 and 2). The label sheet 8, has perforations 64 (Fig. 15), located midway between the printed labels. The perforations act to effect registration of the printed label perfectly upon the cake of gum (Fig. 23) and to that end control the operation of web severing devices. The wrapping webs 8 and 9, as they come from rolls 6 and 7, pass first under a spring arm 53 (Figs. 1 and 2), that produces sufficient slack in the webs to prevent their rupture in overcoming the inertia of the rolls when the webs are intermittently drawn along in the wrapping operation. From spring 53 the webs pass over a roller 52 and under a check spring, 51 (Figs. 1 and 2), which prevents them from being drawn backward by tension of spring 53. They then pass under base-plate 2 to the electric contact-apparatus (Figs. 1 and 2), illustrated in detail in Figs. 13 and 14, where the two webs are separated, the waxed web 9, passing over a separating plate, and the perforated label web 8, passing beneath it. An insulated spring 61, has an upturned pointed end that presses gently against the label web 8, and a hooked contact piece 59. As the webs are moved along the pointed portion of spring 61 slips into the perforations 64 in the label web, thus elevating the contact-piece 59 into contact with a corresponding contact-arm 60, and completing an electric circuit which effects operation of the shearing knife 67. The contact-arm 60 may be adjusted by means of a screw 62 (Figs. 1, 2, 13 and 14). When the webs are again moved, member 61 is depressed as perforation 64 passes on, and the circuit is broken. From the electric contact apparatus, webs 8 and 9 pass through a slot 65 (Figs. 14, 17, 18 and 19), in the base-plate to the top thereof just in front of the hopper 5 in which the cakes of gum are stacked, and as far forward as the shearing knife 67. Just behind knife 67 a spring 57, (Figs. 16, 17, 18 and 19), in the base-plate serves to elevate the ends of the webs.

The carriage 3 is formed of two lateral side-plates (Figs. 3 and 16) joined by cross-pieces 13 and 14, (Fig. 3), forming a rectangular frame. To the side-plates 3, at each end are secured guide-shoes 58 (Fig. 3), grooved to embrace and slide on the edges of base-plate 2. The carriage is connected by a pitman 11 (Figs. 1, 2 and 3), with a crank 12, on a transverse shaft driven by a pulley 10. A cake-ejecting bar 15 (Figs. 1, 2, 3, 17, 18 and 19), is secured to the under surface of cross-piece 14 (Figs. 3 and 18) at the rear end of carriage 3, and to the front cross-piece 13 are secured a long shoe-arm 16 and a short shoe-arm 17, (Figs. 3, 4, 17, 18 and 19). The shoe-arm 16 is provided at its free end with a shoe 18 and a shoe-spring, 68, and the arm 17 with a shoe 19 and a shoe-spring similar to 68. The end of the machine which carries the driving pulley is considered the front. The front and rear sides of hopper 5 do not extend entirely to base-plate 2, but leave an opening of sufficient size for a cake of gum to pass through. Immediately in front of the lower portion of hopper 5 two cake-holding springs 55 and 56 (Figs. 3, 17, 18 and 19) are attached to the hopper, their free ends being adapted to press on base-plate 2.

When the carriage moves forward, it carries ejecting bar 15 (Figs. 17 and 19) which pushes from the hopper the bottom cake of gum onto the end of webs 8 and 9 and under springs 55 and 56 that press it firmly upon the webs, the free ends of which are thrown up by spring 57. When the cake of gum is pushed forward it drops down over the abutment 70, so that it cannot be pushed back toward the hopper. As the carriage moves rearwardly shoe 18 comes in contact with the upturned ends of webs 8 and 9, folds them over upon the cake, and finally the heel of the shoe drops in behind the cake, the shoe-spring 68 holding the folded portion of the webs against the cake. When the carriage 3 is moved forward again, shoe 18 carries the cake of gum with it, (Fig. 19), and the folded over ends of the webs being held by spring 68 the webs are drawn forward with the cake. When shoe 18 has drawn the cake past the cutter slot 66 and carried the webs along until the length of web between the rear end of the cake and cutter slot is the same as that folded upon the cake at the front; or when a perforation in the label-web is mid-way under the cutter or knife 67, the next perforation in the rear will have to come under the point of spring 61 (Fig. 14), the electric circuit is closed, magnet 1' (Fig. 16) attracts its armature carried by trigger 2', and knife 67 being released is thrown down by its spring 6' and serves the paper. The webs now remain at rest with their ends upturned by spring 67 (Fig. 19). Shoe 18, which has not paused, carries the partially wrapped cake over the inclined ledge-strip 71 (Fig. 17) and upon a platform 72 (Figs. 9 and 17). Platform 72 is now stopped by the cam-mechanism illustrated in the upper portion of Fig. 9 and in Fig. 10. The mechanism for operating platform 72 consists of bracket 83, attached to right-hand side of carriage 3, the right-angular lever 84 pivoted at the rear end to the bottom of base-plate 2, the cam-strip 82 is secured to bracket 83, the hinged cam-flap 86, and the standard 85, fixed to lever 84 and carrying the platform. In Fig. 9 platform 72 is represented as elevated flush with the highest point of inclined abutment-strip 71, and lever 84 in corresponding position. The dotted lines in Fig. 9, and the detail view Fig. 10 represent the parts when the platform is dropped. It will be understood that cam 82 moves with the carriage and that lever 84 is stationary. The forward end of cam 82 is tapered on its upper side to form an inclined plane and the rear end is cut off square. When the carriage moves backward, the square end of cam 82 strikes flap 86, folding it back and passes on without elevating lever 84, and, when the cam has passed by, the flap springs into the path of the cam again. When the carriage moves forward in the act of bringing a cake onto the platform, flap 86 slides upon the incline of the cam, is thus elevated and drops off when the end of the cam passes from under it. The purpose of the platform is to furnish a smooth track for the partially wrapped cake in transit and prevent displacement of the wrappers. If the cake were drawn over the ledge of strip 71, without platform 72 being elevated presser-spring 68 would not hold the first fold of the wrappers properly. The ledge is necessary in order to prevent the cake from moving back with the foot and to elevate the rear unfolded ends of the wrappers preparatory to their folding over upon the cake by the presser-spring of foot 19. It will be understood that at this point another cake of gum will have been ejected from the hopper and will be in position under springs 55 and 56. Carriage 3 is now moved rearwardly and while shoe 18 recedes from the first cake lying on platform 72 it is held by a pair of spring-actuated presser-feet 24 and 25 (Figs. 3, 9, 17, 18 and 19), and by an auxiliary presser spring 69, attached to shoe 18, in order to prevent displacing the cake and unfolding the wrappers. At the same time, shoe 19 moves backward, sliding over the partially wrapped cake and over and beyond the rear free ends of the wrappers (Fig. 18) to the position shown in Fig. 18, the free ends of the wrappers being turned up by the ledge formed by ledge-strip 71 into position to be caught by the presser-spring of shoe 19 on its return movement. Carriage 3 now moves forward, drawing with it a second cake and the continuous web wrappers as before; and the unfolded rear ends of the wrappers of the first cake are folded forward over the cake and over the previously folded ends by the presser foot of shoe 19, the heel 19' which drops in behind the cake by reason of a groove in the ledge plate 71, and carries it forward under the scoring springs 22 and 23 (Figs. 3 and 19). These scoring springs are made of small round wire and score the sides of the wrappers down snugly against the edges of the cake, and thus prepare them to be folded over.

Two lateral folding shoes, 20 and 21 (Figs. 3, 17, 18 and 19), are secured to the free rear ends of lever arms 28, 29, pivoted to base-plate 2 and normally spread apart by a spring 30. On the outer sides of arms 28 and 29 are cam-strips 73 and 74 (Fig. 3), adapted to engage cam-rollers 75 and 76 secured on the guide-shoes 58 of the carriage. As the carriage moves forward, cam-rollers 75 and 76 press together arms 28 and 29 and hence shoes 20 and 21, the one shoe a little in advance of the other, and thus the sides of the wrappers are folded snugly over the thin presser-spring of shoe 19 which is pressing down upon the previous folds of the wrapper on the cake of gum. This completes the folding operation. Shoe 19 now carries the folded cake on into the mechanism illustrated in detail in Figs. 11 and 12. The wrapped cake is deposited under a depressor 32, which holds the folds of the wrapper down firmly upon the cake and the presser-spring. The carriage now recedes, the shoe 19 and its presser-spring are withdrawn, and the operations just described are repeated, shoe 18 having deposited another cake on platform 72, etc. A cam-strip 34, is attached underneath cross-piece 13 of the carriage and moves with the carriage. On the top and in the middle of base-plate 2, toward the front, between folding-shoe arms 28, 29 (Figs. 3, 11, 17, 18 and 19) is secured a depressor-spring 31, the free ends of which extends forward over the receptacle for the wrapped cakes and has a depressor-block 32, secured to its under face. On the top of depressor-spring 31 is hinged a depressor-cam-flap 33, which is actuated by a spring so that it normally stands upright in the position shown in Figs. 11 and 17. Whenever cam-strip 34 is drawn forward it drags the free end of flap 33 forward and depresses it against the action of its spring (Figs. 18 and 19), but, when released from strip 34, as is shown in the position illustrated in Fig. 17, it flies up and stands in the path of strip 34. During the absence of strip 34 spring 31 raises depressor 32 to the position shown by the dotted lines (Fig. 11) so that the wrapped cake may be deposited under it (Fig. 17). When now strip 34 is moved backward by carriage 3, strip 34 engages flap 33, depresses depressor 32 and carries cake 36 downward with it into the wrapped-cake-receiving apparatus. On the sides of this cake-receiving apparatus are arranged springs 37 and 38, (Figs. 11 and 12), having their free ends bent, as illustrated, in such a manner that the cake 36 spreads them in passing downward, and they spring in over the edges of the cake so as to hold the cake down firmly upon a packing-platen 39, and at the same time hold the folds of the wrapper down to prevent unfolding. Packing-platen 39 is mounted upon the top of a stem 40, which is adapted to move in a hollow standard 41, and has secured to its lower end a bracket 46 and a pin 47. A spring 48, is adapted to urge stem 40 upward and thus hold the platen 39 always firmly against the cakes 36. It will be understood that as the folded cakes are deposited under depressor 32 and depressed thereby, packing-platen 39 is gradually depressed against the action of spring 48. Stem 40 in passing downward, passes through a tripping-platform 42, and a holding-platform 43, which are pierced to accommodate the stem. Platform 42 is hinged at its forward end in the forward leg 4 (Figs. 1 and 2), and platform 43 is hinged to platform 42 by means of hinge 50. Attached to the right-hand side-plate of carriage 3 is a bracket 80 (Figs. 1, 2 and 11), which extends downward into proximity to platforms 42 and 43. On the lower end of bracket 80 is pivoted, by means of hinge 79, a pusher 77, having an extended arm to which is attached a tension-spring 78, which has a tendency to cause the pusher 77 to stand out at right angles to the plane of bracket 80 and across platform 42. The lower edge of pusher 77, however, normally extends below the edge of platform 42 and hence is prevented by said platform from moving out. It, therefore, normally moves back and forth with carriage 3 folded in and pressing against the right-hand edge of platforms 42 and 43. A spring 44, presses platforms 42 and 43 upward (Figs. 11, 1 and 2). A stem 49, is secured in platform 42, and passes loosely through a hole in platform 43. The stem pushes up platform 42, and a coil-spring 45, on stem 49 holds up platform 43. By this means platform 42 may rise and leave platform 43 still depressed by force applied to its free end.

To the rear of platform 43 is placed a pyramid 87 (Fig. 9), having its upper and lower sides extended at the base and held in position by a bracket 93, attached to base-plate 2. This pyramid is loosely supported in the bracket and has its rear end or apex turned upward, terminating in a stem 99. It is yieldingly held in its bracket against upward movement by a spring 97, which is bifurcated at the free end and provided with a bearing block, 98, at the base of the bifurcation. The four sides of the pyramid are provided with a central longitudinal slot, extending from apex to base. Adapted to move in these four slots are four pusher-arms, 88, having their forward ends notched, and pivoted at their rear ends to a pusher rod 90, which, in turn, is secured by means of a bracket 91, to the right-hand side-plate 3 of the carriage, thus causing arms 88 to move in unison with the carriage. The bottom pusher-arm 88 is provided with a flap 96, which allows the pusher-arm to drag while going backward, but, while going forward, bears against the bottom of bracket 93 and lifts the arm up and thereby also lifts pyramid 87 to provide space for a rubber band to pass between it and the bracket.

Returning now to the receptacle for the wrapped cakes (Figs. 11 and 12), it will be seen that, as packing platen 39 is depressed by the accumulating cakes 36, it finally reaches and sinks into a socket, shown by dotted lines, in the upper surface of platform 42. When depressed into this socket until it bottoms therein the upper surface of the platen forms a continuous surface with that of platform 42. As it is now further depressed, it carries with it platform 42, against the action of spring 44, until platform 42 sinks beyond the lower edge of pusher 77. The machine may be set so that every sixth cake, for example, will depress platform 42 below the lower edge of pusher 77. It will be understood that, since platform 43 presses against platform 42, they form a continuous upper surface at the rear end, and are both depressed together. Pusher 77 now flies out across the platforms by the action of spring 78 and engages the six lowest cakes and carries them back toward pyramid 87 (Figs. 2 and 9) and deposits them in the mouth of the pyramid (Fig. 9). As soon as pusher 77 (Fig. 11) has passed the rear end of platen 39, the platen springs up till it strikes the lowest of the remaining cakes 36 which remain lodged between springs in the bracket above. When pusher 77 has passed the rear end of platform 42 it springs up into the position shown in Fig. 11, but platform 43 is still held down by the pack of cakes 81 and supports it (Fig. 9). When carriage 3 is reciprocated pusher 77 engages the end of platform 42, now elevated, is folded in by it and held in that position until another pack is formed and platform 42 is depressed beyond its lower edge. The open end of pyramid 87 is adapted to accommodate a little less than half of the length of the cakes. When package 81 is deposited into the pyramid, arms 88 are drawn back to their farthest limit, beyond the apex of the pyramid, and the rubber band 94, which previously was suspended in the position shown in Fig. 9 at 95, has been released by the pyramid being pushed back by the pack of cakes 81 and is suspended over the apex of the pyramid. Arms 88 now advance, catch the rubber band in their notched forward ends, and carry it over the pyramid, as shown at 94 in Fig. 9. It will be seen that flap 96 raises the lower arm and, through it, the pyramid above the bottom of its bracket, allowing the band to pass between it and the bracket, and, at the same time, the upper arm 88 bears against shoe 98 on spring 97 and raises the spring so that the upper part of the rubber band has a free passage. The pyramid is held against sliding forward and out of its bracket by its upturned apex bearing against the lug on the bracket which is shown holding the rubber band at 95. When arms 88 have reached their forward limit, the rubber band springs over the base of the pyramid onto and around the package 81 and releases itself from the notched ends of the arms. When this is accomplished, at the beginning of the forward stroke of the carriage, knockout 31' (Figs. 1 and 2) is actuated by catch 32' attached to carriage 3 and throws out the finished package on the left-hand side of the machine.

The rubber bands are strung on stem 99 and delivered to the apex of the pyramid one at a time. This is accomplished by the rubber-band-separator, placed immediately above the upper end of stem 99. 10' represents the rubber band hopper. This hopper is secured in a pivoted bracket, 11'. To the end of bracket 11' opposite that which carries the hopper are attached two chains 12' (Fig. 1) which extend downward in the form of the letter A, and have their ends attached to a double bell-crank lever 13', pivoted on a stationary bracket and having a depending stem disposed in proximity with the left-hand side-plate of carriage 3. At a suitable place on this side-plate is secured a projecting roller, 14', adapted to strike the sides of the stem of lever 13' alternately as the carriage reciprocates. It will be understood that the motion thus imparted to lever 13' gives a jerk to chains 12' at each reciprocation, and thus, through lever 11', a jostling motion to hopper 10'. This is for the purpose of dislodging the rubber bands in the hopper and feeding them continuously to the separator. Immediately below the bottom of hopper 10' is a stationary platen, 17', which is slotted out to form a channel 18', of curved shape, (Fig. 8). The bottom of this channel is formed by a rotary plate 16', attached to the upper end of a shaft 29' provided at its lower end with a sheave pulley connected by means of a round belt 15', with a similar sheave pulley on the driving shaft of the machine. Immediately above plate 16', and adapted to revolve with it, is a sheave 19', and to one side of this sheave is a corresponding sheave 20', the two sheaves being connected by means of a rubber band or other suitable belt. Sheave 20' is connected with and adapted to drive a disk 21', disposed at such a height above plate 16', or the bottom of channel 18', as to allow a single rubber band to pass under it. A disappearing hook 24', is arranged in disk 16' in the bottom of channel 18', and is so operated, by a cam-strip underneath, that it rises when it reaches the orifice of hopper 10', but before it reaches disk 21' it disappears again, leaving the rubber band or bands which it has drawn out from the orifice of the hopper free upon the top of disk 16'. If the rubber bands have issued from the orifice of the hopper in a pile, when they reach disk 21' all except the bottom ones will be pushed aside, leaving the bottom ones to pass on under disk 21' through the remaining part of the channel to their destination at the end of the channel. The superfluous bands are pushed aside and carried by the action of disk 16' to an overflow-chute 22', through which they pass down into a suitable receptacle. Those bands which have passed disk 21' move around to the end of the channel where they strike against a pick 26', or, if the pick is raised at the time, against the end-wall of the channel, by which they are stopped, disk 16' slipping under them. The rubber-band pick 26', is connected by means of chain 28' with a bracket 46, attached to stem 40 of the packing platen 39. Pick 26' is pivoted on a stem and is so connected with a spring 27' that its normal tendency is to fly downward. As cakes 36 accumulate upon the packing platen (Fig. 1), and stem 40 is pushed downward, pick 26' is gradually raised through the instrumentality of chain 28', until it clears the rubber band, which is then carried under it by disk 16' and rests upon the edges of the slot through which the pick must pass in its descent. When pusher 77 is sprung, and has pushed a pack of cakes into the pyramid, platen 39 flies up, releases chain 28' and allows pick 26' to fall to its normal position. In its descent it strikes through the rubber band, carries it through the slot and strings it on stem 99.

The filling of hopper 5 is accomplished and facilitated by the hopper-filler illustrated in Figs. 5, 6 and 7. 35' is the body of the filler. To one end of the body is attached a transverse bottom piece 36'. Two longitudinal strips 37', slightly flared at the outer edge, are secured to the body at one side by means of springs 38', so that they yieldingly press toward each other, but leave a groove between them so as to accommodate the cakes of gum that are stacked in the groove. When the filler is loaded the bottom piece 36' is inserted in the open side of hopper 5 and allowed to rest upon the uppermost cakes of the pile of gum still in the hopper. The filler is then pushed toward the hopper so that the yielding strips 37' spring over the outside of the sides of the hopper, the cakes in the filler being forced into the open side of the hopper where they are retained. Strips 39' are yieldingly secured to the sides of hopper 5 by means of springs in a similar manner to strips 37' on the hopper-filler. The strips 39' are of hook or L-shaped cross section and adapted to spring in over the cakes of gum and retain them in the hopper after they have been pushed in by the hopper-filler.

The means for effecting severance of the web, or webs, is broadly claimed, irrespective of the means for drawing the web and wrapping the cakes, in my application No. 287,744, filed November 16, 1905 the same being a division hereof.

I claim as my invention:—

1. Package wrapping apparatus, comprising the combination of means for feeding the article to be wrapped in position upon a web of wrapping material and a folder constructed and operating to fold the free end of the web upon the article and to then engage the article and draw it forward with the web.

2. Package wrapping apparatus, comprising the combination of means for feeding the article to be wrapped in position upon a web of wrapping material, a folder constructed and operating to fold the free end of the web upon the article and to then engage the article and draw it forward with the web and means for severing the web in rear of the article.

3. Package wrapping apparatus, comprising the combination of means for feeding the article to be wrapped in position upon a web of wrapping material, a device constructed and operating to fold the free end of the web over upon the article and to then engage the article and draw it forward with the web and means for severing the web in rear of the article while it is being drawn forward by the folding and drawing device.

4. Package wrapping apparatus, comprising the combination of a hopper, means for feeding articles one by one therefrom upon a web of wrapping material, a reciprocating folding device acting in its rearward movement to fold the free end of the web over upon the article and to then engage the latter and in its forward movement draw the article and web with it, means for severing the web in rear of the article, means for folding the rear free end of the now severed wrapper over upon the article, means for folding the opposite unfolded ends of the wrapper upon the article and means for discharging the wrapped article from the machine.

5. Package wrapping apparatus, comprising the combination of a hopper, means for feeding articles one by one therefrom upon a web of wrapping material, a reciprocating folding device acting in its rearward movement to fold the free end of the web over upon the article and to then engage the latter and in its forward movement draw the article and web with it, means for severing the web in rear of the article, means for folding the rear free end of the now severed wrapper over upon the article, means for folding the opposite unfolded ends of the wrapper upon the article, a receptacle within which the wrapped articles are accumulated and means for simultaneously withdrawing from the receptacle a determined plurality of the wrapped articles.

6. Package wrapping apparatus, comprising the combination of a hopper, means for feeding articles one by one therefrom upon a web of wrapping material, a reciprocating folding device acting in its rearward movement to fold the free end of the web over upon the article and to then engage the latter and in its forward movement draw the article and web with it, means for severing the web in rear of the article, means for folding the rear free end of the now severed wrapper over upon the article, means for folding the opposite unfolded ends of the wrapper upon the article, a receptacle within which the wrapped articles are accumulated, means for simultaneously withdrawing from the receptacle a determined plurality of the wrapped articles and means for applying a securing band around the plurality of packages so withdrawn from the receptacle.

7. Package wrapping apparatus, comprising the combination of a hopper from which articles to be wrapped are successively delivered upon a web of wrapping material, two folding devices arranged one in advance of the other and reciprocating together the rearmost one nearest the hopper being so constructed and operating that in its rearward movement it folds the free end of the web over upon the article and then engages the article to draw it and the web forward on the reverse or forward movement of said folding device, means for severing the web in rear of the article, a seat or platform upon which the article is delivered by said folding device, the other folding device, furthest removed from the hopper, acting to fold the rear end of the wrapper upon the article and to then engage the latter to remove it and the wrapper in which it is enveloped forward to a new position, and folding devices acting to fold the opposite unfolded ends of the wrapper.

8. Package wrapping apparatus, comprising the combination of a hopper from which articles to be wrapped are successively delivered upon a web of wrapping material, two folding devices arranged one in advance of the other and reciprocating together the rearmost one nearest the hopper being so constructed and operating that in its rearward movement it folds the free end of the web over upon the article and then engages the article to draw it and the web forward on the reverse or forward movement of said folding device, means for severing the web in rear of the article, a seat or platform upon which the article is delivered by said folding device, the other folding device, furthest removed from the hopper, acting to fold the rear end of the wrapper upon the article and to then engage the latter to move it and the wrapper in which it is enveloped forward to a new position, folding devices acting to fold the opposite unfolded ends of the wrapper, a vertically disposed receptacle to which the wrapped articles are delivered, a yielding bottom to said receptacle, a device for withdrawing a given plurality of wrapped articles from the bottom of the receptacle and means for putting said device into operation when the yielding bottom of the receptacle has been depressed to a given point by means of the accumulation of the packages in such receptacle.

9. Package wrapping apparatus, comprising the combination of the reciprocating folding shoe 19 having a forwardly projecting wrapper folder, the vertically movable platform 72 and ledge 71 operating substantially as described.

10. Package wrapping apparatus, comprising the combination of means for feeding the article to be wrapped in position upon a web, a reciprocating shoe adapted to fold a free end of the web around the edge of and down upon the article to be wrapped and then to engage the opposite edge of the article and on reverse movement to draw it and the web forward and having a spring pressure device for holding the folded over end of the web.

11. Package wrapping apparatus, comprising the combination of a package receptacle having a yielding depressible bottom and package retaining devices, means for successively pressing the wrapped or completed packages into such receptacle thereby gradually depressing the yielding bottom below side walls of the receptacle as the packages accumulate therein, and means controlled by the depressible bottom of the receptacle for periodically removing from the bottom of the stack of packages in the receptacle a determined plurality of packages.

12. Package wrapping apparatus, comprising the combination of a shoe 19 having a projecting wrapper folder adapted to fold the free end of a wrapper around one edge of an article and a part adapted to then engage the same edge of the article and move it with the wrapper forward, means for reciprocating the shoe in a line longitudinal to the projecting wrapper folder, means for completing the folding operation and means for discharging the package into a receptacle.

13. Package wrapping apparatus, comprising the combination of means for depositing an article to be wrapped in position upon a web of wrapping material, means for drawing the web and article forward, means for severing the web in rear of the article during the forward movement of the web and article and a web detent device for preventing return or reverse movement of the web after it is severed.

14. Package wrapping apparatus, comprising the combination of means for successively depositing articles to be wrapped in position upon a web of wrapping material, a reciprocating folding device adapted to fold the front free end of the web over upon an article thereon and to then engage the rear end of the article and draw it and the web forward, means for severing the web in rear of the article, a seat upon which the article and partly folded web are deposited at the end of the forward stroke of said folding device, a second folding device which, on its rearward movement, passes over said article and partly folded wrapper and, on its reverse or forward movement folds the rear edge of the wrapper over upon the article, engages the rear edge thereof and moves it and the wrapper forward to a third position, folding devices that act to afford the opposite unfolded edges of the wrapper and means for discharging the folded package thus completed into a receiving receptacle.

15. Package folding apparatus, comprising the combination of a hopper in which articles to be wrapped are contained, means for discharging therefrom an article in position upon a web of wrapping material, means whereby the free end of the web is folded over upon the article and the web and wrapper drawn forward, web severing devices adapted to sever the web in rear of the articles, a device adapted to bear upon the web to enter a perforation or slit therein and means controlled by said device to cause operation of the web severing devices when said device enters a perforation or slit in the web.

16. In a wrapping machine, the combination of means for wrapping articles of uniform shape and size, means for assembling a number of the articles into a pack, and means for applying a rubber band about the pack of such wrapped articles, substantially as specified.

17. In a wrapping machine, means for applying a rubber band over assemblages of wrapped articles comprising a pyramid loosely mounted in a bracket, a stringing stem at the apex of said pyramid, and pushers adapted to strip the rubber band over the base of the pyramid onto an assemblage of wrapped articles, substantially as specified.

18. In a wrapping machine having means for applying rubber bands to packs of articles wrapped by it, a rubber band separator comprising a hopper, a platen pierced with a channel, a revolving disk forming the floor of said channel, and a reciprocating pick, substantially as specified.

19. In a wrapping machine, a base-plate, a hopper for feeding the articles to be wrapped, a reciprocating carriage mounted on said base-plate, said base-plate provided with a web-slot in front of the base of said hopper, a stop-ledge in front of the base of said hopper, presser-springs in front of the base of said hopper, a wrapper-elevating string in the top of said base-plate, a shearing blade in the path of the wrapper and the article being wrapped, an electric circuit-making device on the under side of said base-plate, a magnet adapted to trip said shearing-blade, a reciprocating folding and article-carrying shoe attached to said reciprocating carriage, a second reciprocating folding and article-carrying shoe attached to said carriage, a second stop-ledge on the upper surface of said base-plate beyond said shearing-blade, a movable platform in front of said second stop-ledge, a pair of spring-actuated presser-feet in the path of the article, a pair of spring scoring-wires, a pair of cam-actuated lateral folding-shoes, a depresser, a pair of lateral holding-springs, a yielding packing-platen secured on the upper end of a stem, a tripping-platform, a holding-platform, a reciprocating pack-pusher adapted to be tripped by said tripping-platform, rubber banding means comprising an open-based pyramid mounted loosely in a stationary bracket and reciprocating rubber-band-pushers, a package-knock-out, and a rubber-band separator and feeder comprising a hopper, a channeled platen, a rotary disk and a reciprocating pick, substantially as specified.

20. Package wrapping apparatus, comprising the combination of means for feeding the article to be wrapped upon a wrapper and reciprocating folder - devices having means acting, when reciprocated in one direction, to fold the wrapper upon the article and means acting, when reciprocated in the other direction to engage the article and draw it and the wrapper forward.

JAMES HENRY BRADY.

Witnesses:
 STELLA C. NORRIS,
 ABRAHAM KNOBEL.